United States Patent [19]

Fett

[11] Patent Number: 4,986,608
[45] Date of Patent: Jan. 22, 1991

[54] HIGH TORQUE CAPACITY AXLE SHAFT

[75] Inventor: Gregory A. Fett, Fort Wayne, Ind.

[73] Assignee: Dana Corporation, Toledo, Ohio

[21] Appl. No.: 224,656

[22] Filed: Jul. 27, 1988

[51] Int. Cl.⁵ .................................. B60B 35/12
[52] U.S. Cl. ..................... 301/124 R; 301/124 H
[58] Field of Search ............... 301/124 R, 124 H, 125, 301/126, 131, 132

[56] References Cited

U.S. PATENT DOCUMENTS

| 413,217 | 10/1989 | White | 301/126 |
|---|---|---|---|
| 1,411,981 | 4/1922 | Strong et al. | 301/130 |
| 1,955,824 | 4/1934 | Mogford et al. | 301/124 H |
| 2,022,581 | 11/1935 | Alden et al. | 64/1 |
| 2,052,524 | 8/1936 | Baker | 384/589 |
| 2,134,687 | 11/1938 | Dunham | 180/75 |
| 2,532,605 | 12/1950 | Castleberry | 301/126 X |
| 2,599,575 | 6/1952 | Morgan | 64/1 |
| 2,693,393 | 11/1954 | Heth | 301/1 |
| 3,690,399 | 9/1972 | Bokovoy et al. | 301/124 H X |
| 3,905,089 | 9/1975 | Osenbaugh et al. | 301/124 H X |
| 4,331,210 | 5/1982 | Petrak | 180/70 R |

FOREIGN PATENT DOCUMENTS 498390  9/1954  Italy .................... 301/111

Primary Examiner—Russell D. Stormer
Attorney, Agent, or Firm—Marshall & Melhorn

[57] ABSTRACT

A drive axle shaft for use in a full floating axle assembly includes a spline formed at an inner end thereof and a flange formed at an outer end thereof. A majority of the shaft body between the spline and the flange is of an increased diameter which is slightly smaller than the inner diameter of a reduced inner diameter portion of an axle housing through which the drive axle shaft extends. A pair of tapered portions form the transition between the increased diameter portion and the shaft ends to provide an axle shaft of increased torsional yield strength and torsional fatigue life.

9 Claims, 1 Drawing Sheet

HIGH TORQUE CAPACITY AXLE SHAFT

BACKGROUND OF THE INVENTION

The present invention relates in general to a vehicle axle shaft and, in particular, to a high torque capacity full floating axle shaft for use in vehicles.

During use, vehicle drive axle shafts are subjected to sudden torsional loads applied through both the differential and through attached wheels. After a vehicle has been designed and built, there is a tendency to increase the demands made on the vehicle components through, for example, increases in vehicle speed, increases in vehicle weight and increases in vehicle load capacity. Furthermore, there is also a demand for reliable and long-lived components by vehicle owners and users. It is difficult and expensive to redesign a component to meet new demands and such a redesigned component often requires that other related components be changed. The present invention allows the torque capacity of the full floating axle shaft to be increased without changing the axle housing spindle inner diameter or the shaft diameter within the spindle.

SUMMARY OF THE INVENTION

In a full floating vehicle axle design, a pair of drive axles are mounted inside a hollow axle housing. The inner ends of the drive axles have a spline formed thereon for engaging the side gears of the differential gear assembly. The outer ends of the drive axles have a flange formed thereon for attaching to a hub supported by bearing assemblies on the spindle of the axle housing. The driving wheels are attached to the hubs thereby allowing the axles to "float" between the differential and the wheel hubs and transmit only the driving force from the side gear to the wheel hub. The present invention relates to an improved structure for a full floating axle shaft which provides increased torque yield and torque stress life.

According to the present invention, the diameter of the center portion of the axle shaft between the inner splined end and the outer flanged end is increased by a predetermined amount that still allows the shaft to pass through the spindle. Thus, the effective length of that portion of the drive shaft most likely to fail under torsional stress is reduced. In some instances, it has been found that the decrease in effective length has provided a twenty percent increase in torsional yield and a two hundred fifty percent increase in torsional life span.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
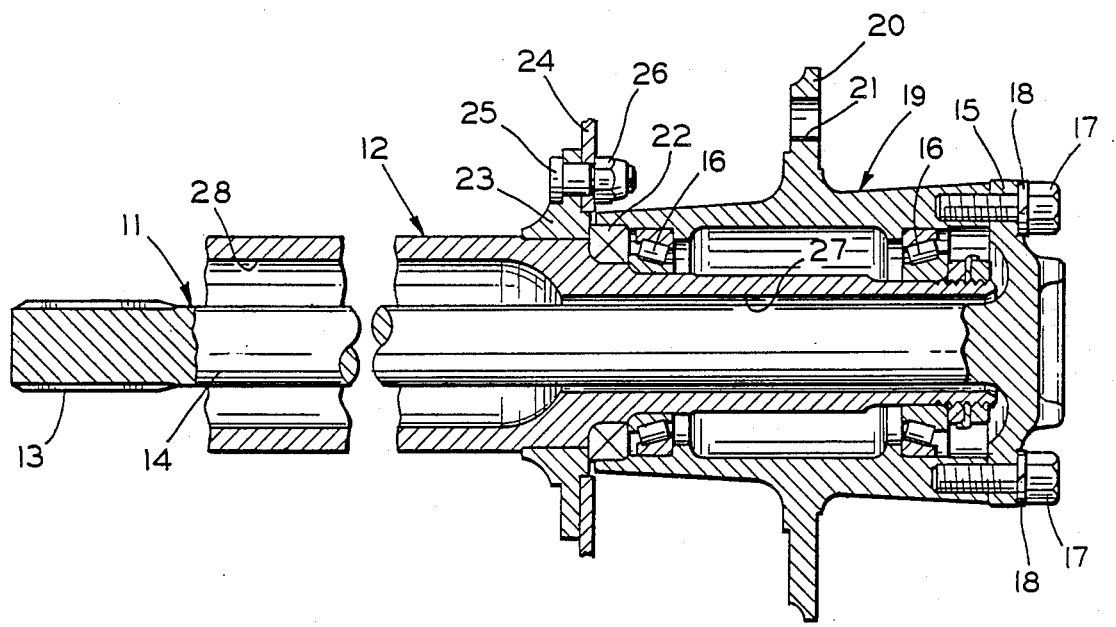
FIG. 1 is a front elevational view in partial cross-section showing a prior art full floating drive axle and an associated axle housing.

There is shown in FIG. 1 a prior art axle construction comprising a drive axle shaft 11 mounted in an axle housing 12. The axle shaft 11 is representative of a pair of such shafts, the inner ends of which engage a differential gear set (not shown) also mounted in the axle housing. Only a portion of the axle housing is shown and in cross section so that the axle shaft 11 is not obscured.

The axle shaft 11 has an inner end 13 on which is formed a spline for engaging a differential side gear (not shown) of the previously mentioned differential gear set. The axle shaft 11 has a generally constant diameter shaft body or center portion 14 which extends from the inner end 13 to a flanged outer end 15. Although the axle shaft 11 extends through the interior of the axle housing 12, it is supported on a pair of tapered roller bearings 16 mounted on the exterior of an outer or spindle end of the axle housing 12. The flanged outer end 15 is attached by any suitable means, such as a plurality of bolts 17 and lock washers 18, to a hub 19. The hub 19 is rotatably supported on the tapered roller bearings 16 and includes a generally radially extending flange 20 which is adapted to have a vehicle wheel rim (not shown) secured thereto. An aperture 21 formed in the flange 20 represents one of a plurality of such apertures for attaching a wheel rim by any suitable means such as bolts and nuts.

The hub 19 is generally tubular with the outer end closed by the flanged outer end 15 of the axle shaft 11. The inner end of the hub 19 is closed by an annular seal 22 mounted on the exterior of the axle housing 12. The annular seal 22 is mounted adjacent a radially extending annular flange 23 attached to the outer surface of the axle housing 12. The flange 23 is utilized to mount the axle housing 12 to a vehicle 24 with fastener means such as a bolt 25 and a nut 26. The outer end of the axle housing 12, upon which the hub 19 is mounted, has a reduced inner diameter portion 27 through which the shaft body 14 extends. The axle housing 12 also has a larger inner diameter portion 28 extending from the reduced diameter portion 27 to the area adjacent the inner end spline 13 of the axle shaft 11.

Figure 2:
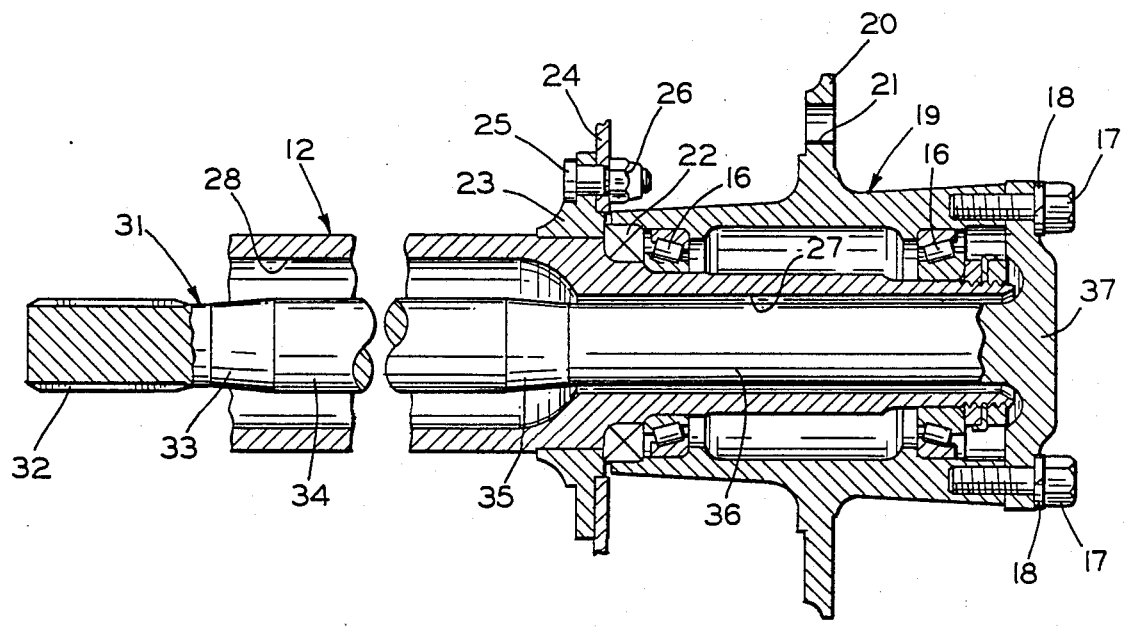
FIG. 2 is a front elevation view in partial cross-section of a full floating drive axle according to the present invention and an associated axle housing.

In FIG. 2, there is shown a drive axle shaft 31 formed in accordance with the present invention. The axle shaft 31 extends through the axle housing 12. The axle shaft 31 is attached to the hub 19 which is supported by the tapered roller bearings 16 on the outer surface of the spindle portion of the axle housing 12. The hub 19 includes the flange 20 for mounting a wheel rim utilizing the apertures 21. The inner end of the hub 19 is closed by the annular seal 22 which is mounted on the axle housing adjacent the flange 23. As stated above, the flange 23 is utilized to mount the axle housing 12 on the vehicle 24 utilizing the bolt 25 and the nut 26.

The drive axle shaft 31 includes an inner end spline 32 for engaging a differential side gear. Adjacent and attached to the splined end 32 is a tapered portion 33 of increasing diameter. The tapered portion 33 provides a transition between the smaller diameter splined end 32 and an increased diameter portion 34 which extends through the larger inner diameter portion 28 of the axle housing 12. At the point where the larger inner diameter portion 28 meets the reduced inner diameter portion 27 of the axle housing 12, the drive axle shaft 31 includes a tapered portion 35. The portion 35 decreases in diameter to provide a transition between the increased diameter portion 34 and a shaft body 36 of smaller diameter which extends into a flanged outer end 37. The flanged outer end 37 is attached to an outer open end of the hub 19 by a plurality of the bolts 17 and lock washers 18.

If the splined ends 13 and 32 are approximately the same diameter and the shaft bodies 14 and 36 are approximately the same diameter, then the tapered portions 33 and 35 and the increased diameter portion 34 of the axle shaft 31 provide increased torque yield and torque stress life by decreasing the effective length of that portion of the shaft most likely to fail under torsional stress. In one application, the increased diameter portion of the drive axle shaft 31 has been found to provide a twenty percent increase in torsional yield and a two hundred-fifty percent increase in torsional life span.

The increased diameter portion 34 of the axle shaft 31 extends for the majority of the shaft length and is of such a diameter that it barely fits through the reduced inner diameter portion 27 of the axle housing 12. Typically, a clearance of one hundred to one hundred twenty thousandths of an inch is used between the maximum diameter of the portion 34 of the axle shaft and the minimum diameter of the portion 27 of the axle housing. In addition, the tapered portions 33 and 35 are formed at a relatively shallow angle with respect to the longitudinal axis of the shaft such as approximately five degrees. Such a configuration shortens the effective length of the shaft with respect to that portion which will yield first under torsional forces. The shorter the shaft length, the higher the ratio of torsional yield to torsional ultimate strength. Thus, for no change in the diameter of the shaft body 36, the torsional yield strength of the axle shaft will increase and the torsional fatigue life, which is based on the torsional yield strength, will also increase. This allows the torque capacity of the axle to be increased without the need for increasing the shaft spline size or the spindle size, and the associated axle housing and hub do not have to be redesigned to obtain the maximum performance from a shaft of a given diameter.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A full floating axle assembly for a vehicle comprising:
    a hollow axle housing having a reduced inner diameter spindle portion at an outer end thereof and a larger diameter portion extending from said reduced inner diameter spindle portion;
    a wheel hub rotatably supported on said axle housing spindle portion;
    a drive axle shaft extending through said axle housing and terminating in a flanged end beyond said reduced inner diameter spindle portion of said axle housing, said drive axle shaft including a smaller diameter shaft body extending from said flanged end and through said reduced diameter spindle portion of said axle housing and an increased diameter portion extending inwardly from said reduced inner diameter spindle portion of said axle housing, said increased diameter portion having a maximum diameter slightly smaller than a minimum inner diameter of said axle housing spindle portion; and
    means for attaching said flange portion of said drive axle shaft to said wheel hub for rotation therewith; whereby torsional yield strength and fatigue life of said drive axle shaft are significantly increased.

2. The axle assembly according to claim 1 wherein said drive axle shaft has a spline formed at an end opposite said flanged end.

3. The axle assembly according to claim 1 wherein said drive axis shaft has opposite end portions of predetermined diameter, said increased diameter portion being positioned between said end portions and connected thereto by tapered portions.

4. The axle assembly according to claim 3 wherein said tapered portions extend at an angle of approximately five degrees with respect to a longitudinal axis of said drive axle shaft.

5. The axle assembly according to claim 1 wherein said increased diameter portion extends for a majority of the length of said drive axle shaft.

6. The axle assembly according to claim 1 wherein a maximum diameter of said increased diameter portion of said drive axle shaft is approximately one hundred thousandths of an inch less than a minimum diameter of said reduced inner diameter spindle portion of said axis housing.

7. The axle assembly according to claim 1 wherein a maximum diameter of said increased diameter portion of said drive axle shaft is approximately one hundred to one hundred twenty thousandths of an inch less than a minimum diameter of said reduced inner diameter spindle portion of said axis housing.

8. The axle assembly according to claim 7 wherein said drive axle shaft has opposite end portions of predetermined diameter, said increased diameter portion being positioned between said end portions and attached thereto by tapered portions extending at an angle of approximately five degrees with respect to a longitudinal axis of said drive axle shaft.

9. In a full floating drive axle assembly having a hollow axle housing with a reduced inner diameter portion at an outer end thereof and a larger inner diameter portion extending inwardly from the reduced inner diameter portion, a wheel hub rotatably supported on the axle housing at the outer end, a drive axle shaft extending through the axle housing and having a flanged outer end and a splined inner end, and fasteners for attaching the flanged outer end to the wheel hub, the improvement comprising: an increased diameter portion formed between smaller diameter inner and outer ends of the axle shaft and a pair of tapered portions attached between said increased diameter portion and the inner and outer ends of the axle shaft forming a transition between the diameter of said increased diameter portion and the smaller diameters of said inner and outer ends of the axle shaft, said increased diameter portion and said tapered portions forming a majority of the length of the axle shaft, said increased diameter portion having a maximum diameter slightly less than a minimum diameter of said reduced inner diameter portion of the axle housing; whereby torsional yield strength and fatigue life of the drive axle shaft are significantly increased.

* * * * *